Aug. 21, 1928.

G. L. BALDWIN 1,681,719

LAWN SPRINKLER

Filed Aug. 2, 1922

INVENTOR.
GERALD L. BALDWIN.
BY A. B. Bowman
ATTORNEY

Patented Aug. 21, 1928.

1,681,719

UNITED STATES PATENT OFFICE.

GERALD L. BALDWIN, OF SAN DIEGO, CALIFORNIA.

LAWN SPRINKLER.

Application filed August 2, 1922. Serial No. 579,218.

My invention relates to lawn sprinklers and the objects of my invention are: first, to provide a lawn sprinkler more particularly for lawn sprinkling systems which may be positioned below the level of the ground so that it will not interfere with the mowing of the lawn and provided with a rotatably mounted discharge portion adapted to automatically rise by the water pressure when turned on so that the spray clears the grass; second, to provide a sprinkler of this class in which the spray of water discharged therefrom will be substantially uniform; third, to provide a novel spray adjusting means in connection with my lawn sprinkler; fourth, to provide a novelly constructed sprinkler of this class and fifth, to provide a lawn sprinkler which is very simple and economical of construction, durable, efficient, easy to install, adjust and operate, and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application in which—

Figure 1:
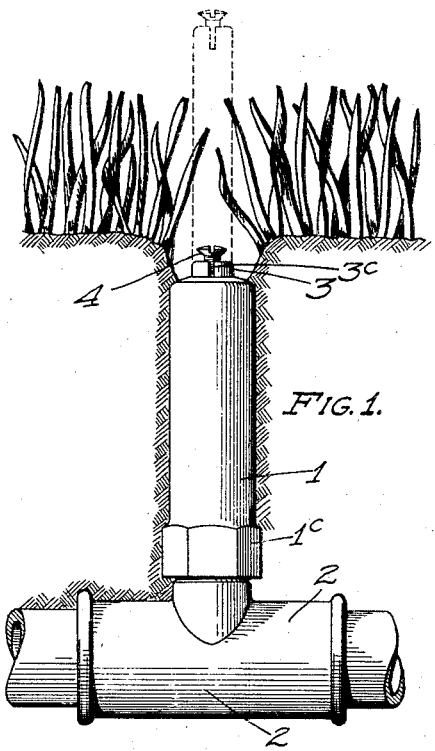
Figure 2:
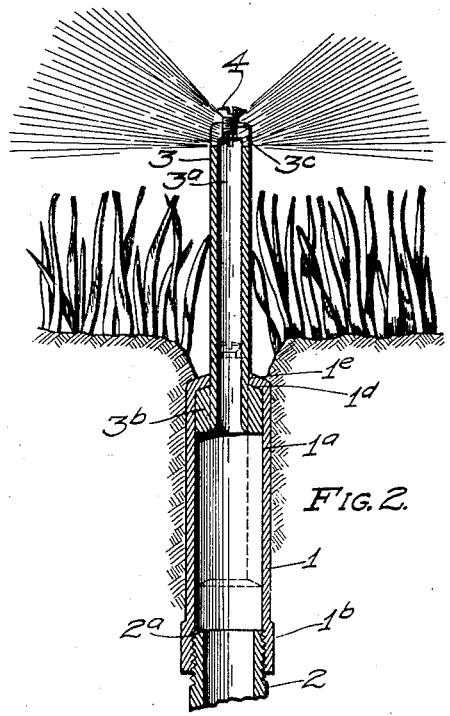
Figure 3:
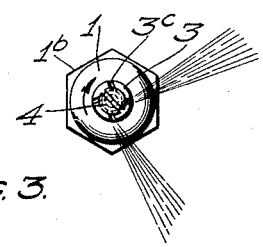

Figure 1 is a side elevational view of my lawn sprinkler connected to a water supply line buried in the ground below the grass, showing by dotted lines the lawn sprinkler in operative position. Fig. 2 is a sectional view thereof showing the nozzle portion through the centers of opposing spray slots with parts and portions in elevation to facilitate the illustration and the remaining, lower portions taken on the center line and at right angles to Fig. 1 but showing by solid lines the sprinkler in operative position, secured to the pipe fitting shown fragmentarily and showing by dotted lines the receded position of the nozzle member of the sprinkler, and Fig. 3 is a plan view thereof.

Like characters of reference refer to similar parts and portions throughout the several views of the drawings.

The casing member 1, pipe fitting 2, nozzle member 3 and the screw 4 constitute the principal parts and portions of my lawn sprinkler structure.

The casing 1 is cylindrical in shape and provided with a longitudinal central hole $1^a$ and with internal threads $1^b$ at its lower end. Said casing is also provided with a polygonally shaped portion $1^c$ at its lower end to facilitate the screwing of the casing onto the pipe fitting 2. Said pipe fitting may be of any conventional form but preferably provided with external threads at the portion connecting with the casing 1 and also provided with an end which forms a shoulder $2^a$ when screwed into the casing 1. The casing 1 is also provided with an inner annular slightly receding shoulder $1^d$ at the other end from the internally threaded portion and with a smaller concentric hole $1^e$ in the same end of the casing. A cylindrically shaped plunger forming the nozzle member 3 provided with a central hole $3^a$ and with an enlarged portion $3^b$ at one end is reciprocally mounted in the casing 1, limited at its lower end by the shoulder $2^a$ formed by screwing the pipe fitting 2 into the casing 1 and at its upper end by the shoulder $1^d$ in the casing 1. Said plunger 3 is provided at its upper end with a plurality of narrow slots $3^c$ extending from the central hole $3^a$ to the outside thereof and are preferably positioned at an angle with the radial line extending through the axis of the plunger so as to impart to the plunger a revoluble motion when the water is forced through the slots therein. A screw 4, preferably provided with a countersunk head, is provided at the upper slotted portion of the plunger 3 to adjust the effective size of the openings and therefore the angle of the spray and amount of water discharged.

Though I have shown and described a particular construction, combination and arrangement of parts and portions I do not wish to be limited to this particular construction, combination and arrangement but desire to include in the scope of my invention the construction, combination and arrangement substantially as set forth in the appended claims.

It is obvious that I have provided a lawn sprinkler which may be positioned below the level of the ground and the discharge nozzle will rise when the water is turned on and drop down when it is turned off; that the bare spaces in the lawn will thus be reduced to a minimum by the use of my sprinkler; that when the water is turned into the supply line connected to my sprinkler the discharge openings will be raised above the surrounding area and spread the water uniformly; that I have provided novel spray and volume adjusting means and that I have provided a lawn sprinkler which is very simple and economical of construction, durable, efficient, easy to install, adjust and operate and which will not readily deteriorate or get out of order.

Having thus described my invention what I claim as new and desire to secure by Letters Patent is:

1. In a lawn sprinkler, a hollow, reciprocally mounted plunger provided with relatively long, narrow, partially vertical and partially horizontal, angularly positioned slots extending outwardly from the middle portion thereof, whereby a revoluble motion is imparted to said plunger by the efflux of the water from said slots, and a bevel-headed screw mounted centrally in said plunger contiguous to said slots positioned so that the water impinges upon said head to regulate and direct the flow of water from said slots.

2. In a lawn sprinkler, a hollow nozzle member provided with a central threaded aperture and with relatively long, narrow slots opening into said aperture and directed outwardly and upwardly on an angle to the vertical axis of said nozzle member from the inner portion of said nozzle at its upper end, and a spray adjusting screw mounted in said aperture for adjusting the effective size and shape of the inlet to said slots.

3. In a lawn sprinkler, a hollow plunger provided with relatively long, narrow, partially vertical and partially horizontal slots directed outwardly on an angle to the vertical axis of said plunger from the inner portion thereof, and a spray adjusting screw mounted centrally on the end of said plunger contiguous to said slots.

4. In a lawn sprinkler, a hollow revolubly mounted plunger provided with relatively long, narrow, partially vertical and partially horizontal, angularly positioned slots extending outwardly from the middle portion thereof whereby a revoluble motion is imparted to said plunger by the efflux of the water from said slots, and a bevel-headed screw mounted centrally in said plunger contiguous to said slots positioned so that the water impinges upon said head to regulate and direct the flow of water from said slots.

5. In a lawn sprinkler, a tubular revolubly mounted member provided at one end with slots which extend from the inner to outer periphery of said tubular member on an angle with the axis of said tubular member and thereby imparting a revoluble motion to said tubular member by the efflux of water from said slots, a bevel-headed screw mounted centrally in said tubular member contiguous to said slots positioned so that the water impinges upon said head to regulate and direct the flow of water from said slots, and means for adjusting said screw.

In testimony whereof, I have hereunto set my hand at San Diego, California, this 27th day of July, 1922.

GERALD L. BALDWIN.